Aug. 28, 1962 H. SOUMERAI 3,051,373
ENCLOSED MOTOR COMPRESSOR UNIT
Filed April 29, 1960

HENRI SOUMERAI
INVENTOR.

BY Daniel A. Bobb
Atty.

United States Patent Office 3,051,373
Patented Aug. 28, 1962

3,051,373
ENCLOSED MOTOR COMPRESSOR UNIT
Henri Soumerai, Springfield, Mass., assignor to Worthington Corporation, Hudson, N.J., a corporation of Delaware
Filed Apr. 29, 1960, Ser. No. 25,610
1 Claim. (Cl. 230—206)

This invention relates to an enclosed motor-compressor unit, commonly called a hermetic compressor, and more particularly provides means for association with a unit such as is shown in the application of Henry M. Tower, filed July 3, 1959, for an enclosed motor compressor unit, Ser No. 824,809, now U.S. Patent No. 2,963,218, which means act to substantially minimize the effect that lubricant has on the motor windings.

Analysis of units embodying pressure balancing means such as is contemplated in above application indicates that the prior problem of returning lubricant from the driving compartment to the compression compartment has been overcome.

However, in solving the foregoing problem other operational disadvantages are present, or, by way of example, lubricant leaking through the bearing in the partition is picked up by the pumping means or fan and flung outwardly against the windings of the electric driving means usually associated with those units. Lubricant ejection against the windings as is well known in the art acts to erode the insulation on the winding. This action as will be readily understood can render the machine inoperative.

To overcome the foregoing deficiency in the prior art applicant provides means for association with the unit that substantially minimize the erosive effect that lubricant has on the windings of the driving means.

This is accomplished as will be described in detail hereinafter by providing a baffle-like member in spaced relation with the bearing housing which baffle acts to deflect the lubricant downwardly and away from the windings of the driving means during operation of the unit.

Accordingly, it is an object of this invention to provide an improved enclosed motor compressor unit.

It is a further object of the present invention to provide means for association with a unit having pressure balancing members, which minimize the effect that lubricant has on the motor windings.

It is another object to accomplish the foregoing with a device that is simple in construction and readily incorporated in a standard unit without costly redesign.

With the foregoing objectives in view, and others as may appear from the accompanying specification, the invention consists of various features of construction and combination of parts, which will be first described in connection with the accompanying drawings, showing an enclosed motor-compressor embodying the novel means for accomplishing the above objectives, and the features of the invention will be specifically pointed out in the claims.

Figure 1:
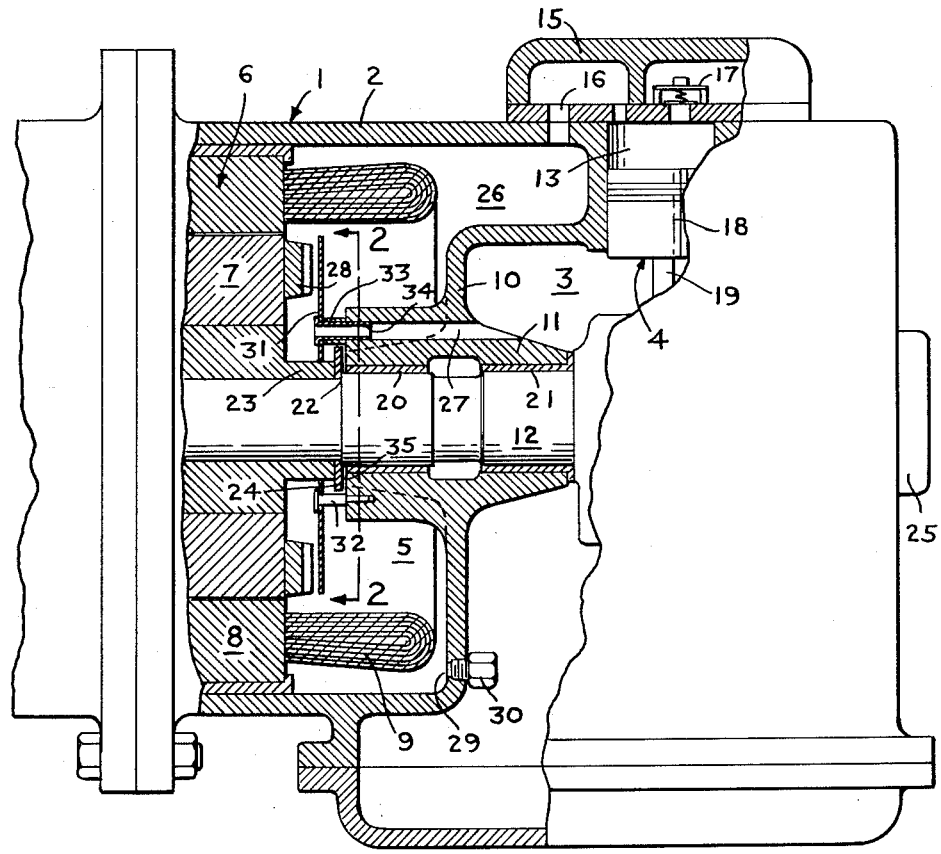
FIGURE 1 is a longitudinal view in part section showing the enclosed motor-compressor embodying the invention.
Figure 2:
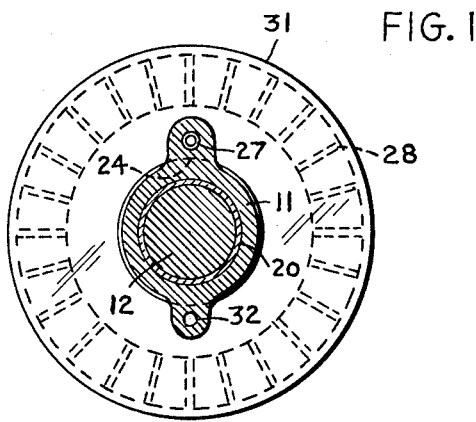
FIGURE 2 is a part section taken on line 2—2 of FIGURE 1.

Referring more particularly to the drawings, FIGURE 1 thereof illustrates the enclosed motor-compressor unit generally designated 1 embodying the present invention. The motor-compressor unit is of the usual type and comprises a casing 2 divided into the usual compression compartment 3 including the usual compression means generally designated 4 and a driving compartment 5 including a driving means shown as electric motor 6 having a rotor portion 7 and stator portion 8 which includes usual insulated windings 9 by a partition means 10 which maintains the respective compartments substantially sealed from one another. The bearing housing 11 is formed in the central portion of the partition and is adapted to accommodate the usual shaft 12 which interconnects the compression means 4 to the driving means 6, the compression means receiving power from the driving means to circulate working fluid of the refrigeration system with which it is associated.

Referring to FIGURE 1 in greater detail, a cylinder 13 is formed in the compression compartment 4 which can be an integral portion of the casing. The usual cylinder head 15 is secured to the casing and any suitable arrangement of intake and exhaust valves 16 and 17 for controlling the passage of working fluid from and to the compressor may be employed. In order to compress the working fluid I have provided a piston 18 adapted for reciprocation in the cylinder 13. The driving mechanism for the piston 18 comprises the usual connecting rod 19 shown in part and drivably connected as is customary to shaft 12 which turns in bearing members 20 and 21 suitably retained in the portion of the partition 10 forming the bearing housing 11. Provision of the bearing housing as an integral portion of the partition 10 as shown substantially reduces the manufacturing costs of the compressor contemplated herein. Shaft 12 is necked down as at 22 so that it may be received by the rotor 7 of driving means 6. The portion of the rotor 7 as at 23 is extended to coact with the shaft 12 at the necked down portion to provide a space for receiving the baffle member 24 as will be described hereinafter. Any well known lubricating means 25 may be used to supply lubricant to bearings 20 and 21 and other portions requiring lubrication.

In a normal application working fluid from the low side of the refrigeration cycle is received by the compressor through an inlet, not shown, usually provided on the outboard side of the driving compartment 5. This fluid is then passed in heat exchange relationship with the driving means 6 and from there to the suction manifold 26 formed adjacent the partition and in operative communication with the compression portion of the compressor through intake valve means 16 and cylinder means 13 for passage to the high side of the cycle through exhaust valve 17.

In order to alleviate the arresting effect that the high pressure build-up of refrigerant in the compression compartment has on lubricant collected in the driving compartment as discussed hereinabove and in such fashion so as not to interfere with the cooling action that the system fluid has on the motor of the unit; a passage means taking the form of port 27 is disposed in the upper portion of the bearing housing 11 in order to provide communication between the compression portion 3 and the suction manifold 26 formed in the driving compartment. Vane-like means 28 are fashioned on the movable portion or rotor of the driving means 6 mounted in the driving compartment. These vane-like elements 28 which are equally spaced about the rotor and preferably formed as an integral portion thereof as by casting are in proximate relation with the passageway 27 and function to flow fluid or refrigerant from the compression portion of the compressor to the driving compartment through passageway 27.

Disposition of the fan formed by the vanes 28 in proximate relation with the port 27 in the bearing housing 11 to circulate refrigerant as was mentioned hereinabove causes a reduction in pressure in the compression compartment whereby lubricant collected in the base of the driving compartment can readily flow or return through vent means 29 including check valve 30 mounted therein, in the lower portion of the partition 10 to the compression compartment. In order to provide a more efficient action by the fan formed by the vane-like elements 28 a circular baffle-like member 31 is disposed about shaft 12 as is shown in FIGURE 1 of the drawings. Means taking the form of spacer rivet 32 and spacer 33 with tube 34 projecting therefrom connect the baffle 31 to the bearing housing at the lower portion thereof and at port 27 to maintain same in proximate relation with the vanes 28 to form a partial housing for the fan to thereby increase the fluid-flowing capacity thereof. Accordingly, refrigerant is more effectively passed from the compression compartment through the tube 34 in the circular baffle 31 to the suction manifold and from there to the suction side of the compression compartment.

As was mentioned hereinabove lubricant tends to leak past bearing 20 in a direction towards the driving means, and with devices of the type described hereinabove the fan tends to sling the lubricant against the windings 9 of the motor 6.

To remedy the foregoing, means taking the form of baffle 24 is connected to shaft 12 and is disposed to direct this lubricant downwardly into the motor compartment.

More particularly the baffle 24 takes the form of a circular disc which is connected between the end 23 of rotor 7 and the necked down portion 22 of shaft 12 and spaced relative to the bearing housing 11 to form a space 35 therewith and provide a barrier which prevents lubricant from flowing into the fan means wherefrom it may be ejected against the windings and at the same time direct this lubricant downwardly into the bottom of the driving compartment through space 35.

It will be understood that the invention is not to be limited to the specific construction or arrangement of parts shown but that they may be widely modified within the invention defined by the claim.

What is claimed is:

In a compressor of the hermetic type including a casing, partition means for dividing the casing into a driving compartment and a compression compartment, compression means in the compression compartment and driving means having a rotatable portion disposed in the driving compartment, said partition means forming a bearing housing for accommodating a shaft, said shaft journaled in said bearing housing to operatively interconnect said driving means to said compression means, a port through the portion of said partition forming said bearing housing, said port providing communication between said driving compartment and said compression compartment, fan means formed on the rotatable portion of the driving means and in spaced relation with said port to flow fluid from said compression compartment to said driving compartment, a circular baffle about said shaft, means for connecting said circular baffle to the bearing housing and for maintaining said circular baffle in spaced relation with respect to said bearing housing and with said fan means to provide a portion of a housing for said fan means whereby the operative efficiency of said fan means is increased, said last mentioned means comprising a spacer means disposed through the lower portion of said circular baffle and connected to said bracing housing and a tube member connected at one end to the upper portion of said circular baffle and disposed in said port at the other end, a baffle member connected to the shaft between the partition means and the fan means and disposed in spaced relation with said bearing housing to form a space therebetween whereby lubricant leaking out of said bearing housing strikes said baffle member and flows downwardly through said space into the driving compartment, and means in the lower portion of the partition providing operative communication between the driving compartment and the compression compartment whereby lubricant flows from the driving compartment to the compression compartment.

References Cited in the file of this patent

UNITED STATES PATENTS

| | | |
|---|---|---|
| 901,499 | Tolman | Oct. 20, 1908 |
| 982,165 | Whitney | Jan. 17, 1911 |
| 1,780,784 | Gunn | Nov. 4, 1930 |
| 2,174,536 | Smith | Oct. 3, 1939 |
| 2,248,405 | Freeman | July 8, 1941 |
| 2,264,847 | Johnson | Dec. 2, 1941 |
| 2,306,608 | Hubacker | Dec. 29, 1942 |
| 2,963,218 | Tower | Dec. 6, 1960 |